US009609188B2

United States Patent
Iwamatsu

(10) Patent No.: US 9,609,188 B2
(45) Date of Patent: Mar. 28, 2017

(54) IMAGE PICKUP APPARATUS

(71) Applicant: CANON KABUSHIKI KAISHA, Tokyo (JP)

(72) Inventor: Junichiro Iwamatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/748,470

(22) Filed: Jun. 24, 2015

(65) Prior Publication Data

US 2016/0006958 A1    Jan. 7, 2016

(30) Foreign Application Priority Data

Jul. 2, 2014    (JP) ................... 2014-136672

(51) Int. Cl.
  *H04N 5/225* (2006.01)
(52) U.S. Cl.
  CPC ................. *H04N 5/2253* (2013.01)
(58) Field of Classification Search
  CPC ............ H04N 5/2253; H04N 1/00994; G02B 2207/121; H05K 9/00–9/0098; H01L 2225/06537
  See application file for complete search history.

(56) References Cited

U.S. PATENT DOCUMENTS

| 2004/0001157 A1* | 1/2004 | Chan .................... H04N 5/2253 348/335 |
| 2005/0030419 A1* | 2/2005 | Kikuchi ............... H04N 5/2252 348/375 |
| 2010/0045846 A1* | 2/2010 | Nishizawa ........ H01L 27/14618 348/340 |
| 2011/0102652 A1* | 5/2011 | Lu ........................ H04N 5/2253 348/294 |

FOREIGN PATENT DOCUMENTS

| JP | 2005-039691 A | 2/2005 |
| JP | 2013-257486 A | 12/2013 |

* cited by examiner

*Primary Examiner* — Christopher K Peterson
(74) *Attorney, Agent, or Firm* — Fitzpatrick, Cella, Harper & Scinto

(57) ABSTRACT

An image pickup apparatus includes an image pickup element converting an object image to an electric signal, a magnetic shield member arranged in front of the image pickup element, a fixing member to which the image pickup element and the magnetic shield member are attached, and an elastic member arranged between the magnetic shield member and the image pickup element, and configured to press the image pickup element so as to surround a circumference of a light receiving plane of the image pickup element and to press the magnetic shield member toward the fixing member.

7 Claims, 4 Drawing Sheets

IMAGE PICKUP APPARATUS

BACKGROUND OF THE INVENTION

Field of the Invention

The invention relates to an image pickup apparatus that includes a magnetic shield member shielding a magnetic noise incident to an image pickup element.

Description of the Related Art

Higher fluctuation of a driving current while applying a current to a driving coil of an actuator, which drives an optical member, leads to higher fluctuation of a generated magnetic field. An influence of fluctuations of a magnetic field by the driving coil varies an image pickup signal of an image pickup element. In Japanese Patent Laid-open 2013-257486, using a LC filter smoothes current through a driving coil and reduces fluctuations of a current to decrease noises, such as horizontal lines, in an image output by a video signal processor. Japanese Patent Laid-open 2005-039691 discloses an image pickup apparatus that includes a shield member shielding a magnetic noise to an image pickup element.

However, in the configuration of Japanese Patent Laid-open 2013-257486, using the LC filter increases power consumption of an image pickup apparatus with increasing power consumption of a smoothed circuit and decreases the number of photographable images of the image pickup apparatus. Moreover, heat of the smoothed circuit boosts an electric voltage of the image pickup apparatus.

Additionally, since the configuration of Japanese Patent Laid-open 2005-039691 needs a screw and an adhesive so as to fix the magnetic shield member to a lens barrel, the number of components and assembly man-hours increases and further the image pickup apparatus thickens when fixed by the screw.

SUMMARY OF THE INVENTION

In view of foregoing, the invention provides an image pickup apparatus capable of holding a shield member using a simple configuration, which needs the small number of components, and decreasing a magnetic noise.

An image pickup apparatus as one aspect of the invention includes an image pickup element converting an object image to an electric signal, a magnetic shield member arranged in front of the image pickup element, a fixing member to which the image pickup element and the magnetic shield member are attached, and an elastic member arranged between the magnetic shield member and the image pickup element, and configured to press the image pickup element so as to surround a circumference of a light receiving plane of the image pickup element and to press the magnetic shield member toward the fixing member.

Further features of the invention will become apparent from the following description of exemplary embodiments with reference to the attached drawings.

DESCRIPTION OF THE PREFERRED EMBODIMENTS

Figure 1:
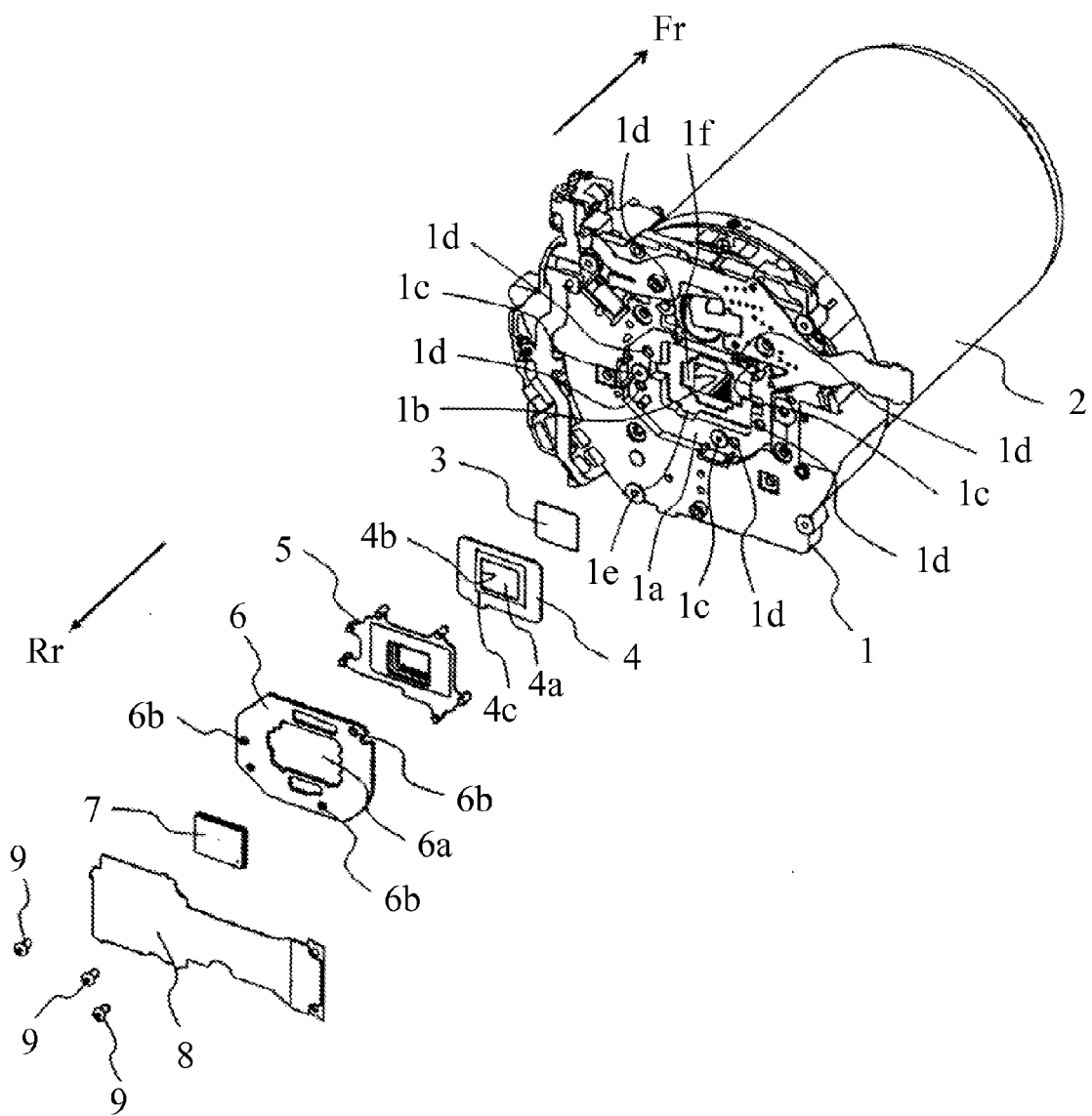
FIG. 1 is an exploded perspective view illustrating an internal configuration of an image pickup apparatus according to an embodiment of the invention.

Exemplary embodiments of the invention will be described below with reference to the accompanied drawings. In each of the drawings, the same elements will be denoted by the same reference numerals and the duplicate descriptions thereof will be omitted. In this embodiment, a digital camera is described as one example of an image pickup apparatus. In each figure, a front direction Fr represents a front direction of the digital camera (direction close to an image pickup optical system) and a rear direction Rr represents a direction opposite to the front direction Fr (direction away from the image pickup optical system).

FIG. 1 is an exploded perspective view illustrating a part of components of the digital camera, and mainly illustrates components around an image pickup element. The digital camera includes a fixing base plate 1, a lens barrel 2, an optical filter 3, a magnetic shield plate 4, a dustproof rubber 5, a holding plate 6, an image pickup element 7, a flexible substrate 8, and three adjusting screws 9.

The fixing base plate (fixing member) 1 equips the lens barrel 2 and the image pickup element 7. A housing room 1a being in a concave shape to house the image pickup element 7 is formed at a plane of the fixing base plate 1 opposite to a plane thereof to fix the lens barrel 2. An opening part 1b through which incident light of object light through an image pickup optical system (not illustrated) of the lens barrel 2 passes is formed in the housing room 1a. Three female screw parts 1c screwed with the adjusting screws 9 and a plurality of bottomed holes 1d taken along an optical direction are formed around the housing room 1a.

The optical filter 3 cuts noises from optical light passed through the image pickup optical system of the lens barrel 2. The optical filter 3 being in a flat plate shape is held in a housing room (housing part) 1f located behind the opening part 1b of the fixing base plate 1 by the dustproof rubber 5 through the magnetic shield plate 4. The optical filter 3 is attached to the fixing base plate 1 to be located in front of the magnetic shield plate 4.

The magnetic shield plate (magnetic shield member) 4 arranged in the lens barrel 2 shields a magnetic noise generated by a driving coil of an actuator (not illustrated), which is used for a shutter, an aperture, an image stabilizer, and a focusing apparatus. The magnetic shield plate 4 being in a flat plate shape is held by the dustproof rubber 5 to be arranged behind the optical filter 3. The magnetic shield plate 4 is arranged in front of the holding plate 6 and the image pickup element 7 discussed below. The magnetic shield plate 4 is made of a soft magnetic alloy material, which is a ferromagnetic member. Iron, silicon steel, and amorphous alloy may be used as the soft magnetic alloy material, but iron-nickel alloy (permalloy) is used in view of a function and a cost in this embodiment. The magnetic shield plate 4 includes an opening part 4a through which incident light of object light passes and a convex part 4b that is fitted in a concave part 1e formed in the housing room 1a of the fixing base plate 1 to control a position of the magnetic shield plate 4 in a plane perpendicular to an optical axis. The magnetic shield plate 4 also includes a stepped part 4c abutting against the optical filter 3 and the dustproof rubber 5 when held by dustproof rubber 5.

The dustproof rubber (elastic member) 5 is made from an elastic material, such as a rubber. The dustproof rubber 5 arranged behind the magnetic shield plate 4 holds the magnetic shield plate 4. The dustproof rubber 5 is sandwiched between the fixing base plate 1 and the holding plate 6 discussed below. The dustproof rubber 5 attached to the fixing base plate 1 abuts against the image pickup element 7 to surround a circumference of a light receiving plane of the image pickup element 7. The dustproof rubber 5 thus prevents dust from adhering to the receiving plane of the image pickup element 7.

The holding plate (holding member) 6 is made of a metal material, such as stainless steel and phosphor bronze. The holding plate 6 holds the image pickup element 7 and the flexible substrate 8. The holding plate 6 being in a flat plate shape includes an opening part 6a housing a part of a circumference of a package of the image pickup element 7. The holding plate 6 includes inserting holes 6b into which the adjusting screws 9 are inserted so as to be supported to the fixing base plate 1 by the adjusting screws 9. The holding plate 6 holding the image pickup element 7 and the flexible substrate 8 is arranged behind the dustproof rubber 5.

The image pickup element 7 converts an object image passing through the image pickup optical system of the lens barrel 2 into an electric signal. The image pickup element 7 is soldered to the flexible substrate 8.

The flexible substrate 8 transmits the converted electric signal to other processing circuit (not illustrated).

Figure 2:
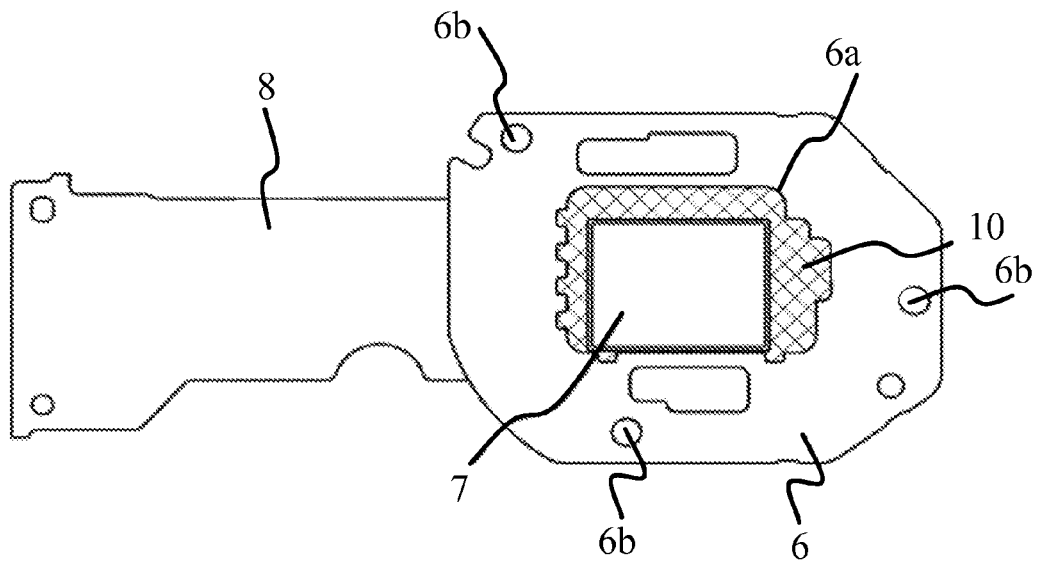
FIG. 2 is a schematic diagram illustrating a holding plate with an image pickup element and a flexible substrate.

The holding plate 6, the image pickup element 7, and the flexible substrate 8 are previously integrated before an assembly. FIG. 2 is a schematic diagram illustrating the holding plate 6 with the image pickup element 7 and the flexible substrate 8 viewed from the front direction Fr. As illustrated in FIG. 2, when the part of the circumference of the package of the image pickup element 7 is inserted into the opening part 6a of the holding plate 6, applying an adhesive 10 between the package of the image pickup element 7 and the opening part 6a fixes the image pickup element 7 to the holding plate 6. An elastic force of the dustproof rubber 5 adjusts a position along the optical axis and a tilt relative to the optical axis of the image pickup element 7.

Figure 3:
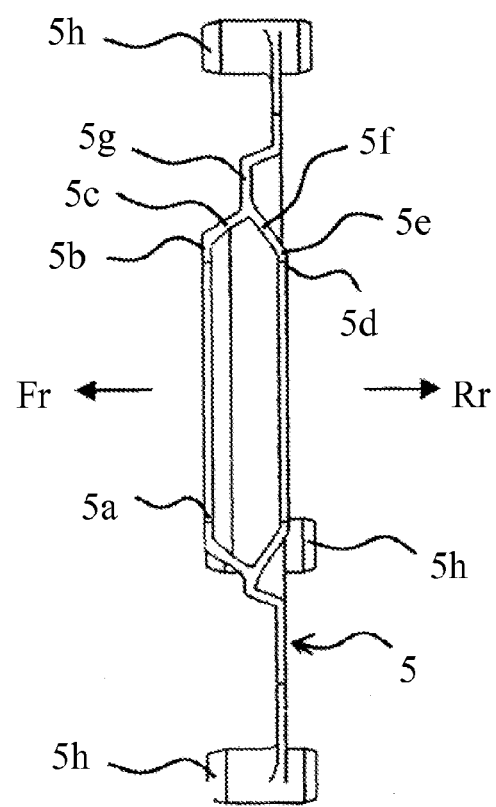
FIG. 3 is a longitudinal sectional view of a dustproof rubber.

Here, a detailed shape of the dustproof rubber 5 is described referring to FIG. 3. FIG. 3 is a longitudinal sectional view of the dustproof rubber 5.

When viewed from the front direction Fr, an opening part 5a larger than the opening part 4a of the magnetic shield plate 4 is formed at the center of the dustproof rubber 5. A pressing part (first pressing part) 5b abutting against a rear face of the magnetic shield plate 4 is formed at a circumference of the opening part 5a. The pressing part 5b presses the optical filter 3 and the magnetic shield plate 4 to the fixing base plate 1. The pressing part 5b includes a dustproof part 5c obliquely protruding toward a circumference of the dustproof rubber 5 along the rear direction Rr. A thickness of the dustproof part 5c is thicker than a thickness of a dustproof part 5f. When viewed from the rear direction Rr, an opening part 5d smaller than the image pickup element 7 is formed at the center of the dustproof rubber 5. A pressing part (second pressing part) 5e abutting against a front face of the image pickup element 7 is formed at a circumference of the opening part 5d. The pressing part 5e includes the dustproof part 5f obliquely protruding toward the circumference of the dustproof rubber 5 along the front direction Fr.

Connecting a flange part 5g to the dustproof parts 5c and 5f enables the dustproof rubber 5 to have an elastic force, and this elastic force causes the pressing part 5b to press the optical filter 3 and the magnetic shield plate 4 toward the fixing base plate 1. In other words, the pressing part 5b presses the magnetic shield plate 4 to the fixing base plate 1, and the pressed magnetic shield plate 4 presses the optical filter 3 to the fixing base plate 1. The optical filter 3 is fitted in the housing room 1f of the fixing base plate 1 to have a predetermined gap relative to a wall of the housing room 1f so that its position is controlled in a plane perpendicular to the optical axis, and is pressingly held by the elastic force of the dustproof rubber 5 through the magnetic shield plate 4 in the optical axis direction. This allows the magnetic shield plate 4 to be positionally controlled and to be held without adding a dedicated fixing member, such as a screw and an adhesive.

When a force along the optical axis to close a distance between the pressing parts 5b and 5e acts on the dustproof rubber 5, an elastic force to separate a distance between the pressing parts 5b and 5e works to the dustproof parts 5c and 5g. In other words, when the holding plate 6 moves in the front direction Fr, the dustproof part 5c urges the optical filter 3 and the magnetic shield plate 4 in the front direction Fr through the pressing part 5b and further the dustproof part 5f urges the image pickup element 7 in the rear direction Rr through the pressing part 5e. The elastic forces of the dustproof parts 5c and 5f eliminate a gap between the magnetic shield plate 4 and the dustproof rubber 5 and a gap between the dustproof rubber 5 and the image pickup element 7, and seal a space between the magnetic shield plate 4 and the image pickup element 7 to prevent foreign matter such as dust from getting into the space.

An urging part (protruding part) 5h that protrudes in the optical axis direction and is in a salient shape is formed on an outer periphery of the flange part 5g of the dustproof rubber 5. The urging part 5h being in a cylindrical shape along the optical axis can extend along the optical axis. An outer diameter of the urging part 5h is formed to be capable of being inserted into the bottomed hole 1d corresponding to the fixing base plate 1. An elastic force generated in the urging part 5h is larger than the elastic forces generated in the dustproof parts 5c and 5f. As described below, the elastic force generated in the urging part 5h changes screwing amounts of three adjusting screws 9 to finely adjust a position of the image pickup element 7 in the optical axis direction and a tilt relative to the optical axis of the image pickup element 7.

Next, an assembly method so as to attach the optical filter 3, the magnetic shield plate 4, the dustproof rubber 5, the holding plate 6, the image pickup element 7, and the flexible substrate 8 to the fixing base plate 1 is described referring to FIGS. 4A to 4C and FIG. 5.

Figure 4A:
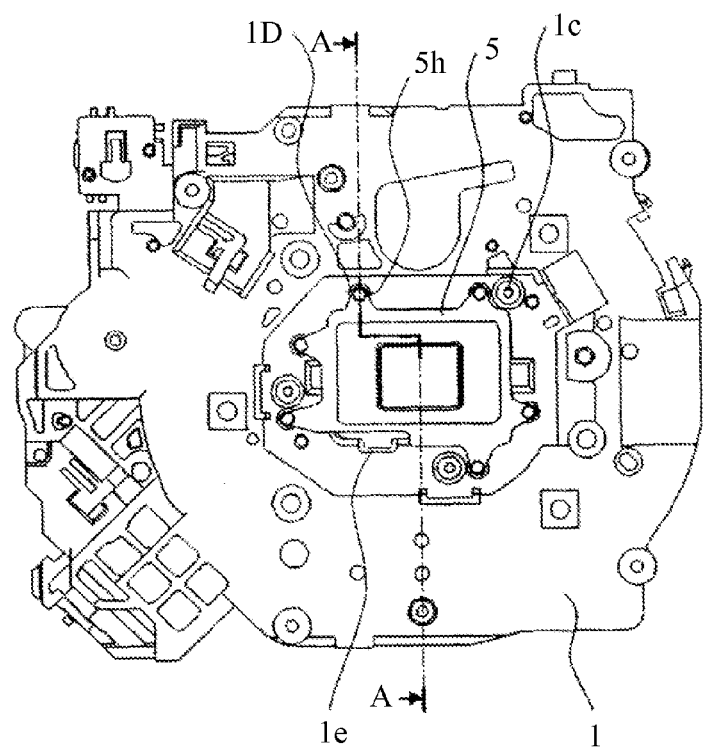
FIGS. 4A to 4C are schematic diagrams illustrating a fixing base plate with each component.
Figures 4B, 4C:
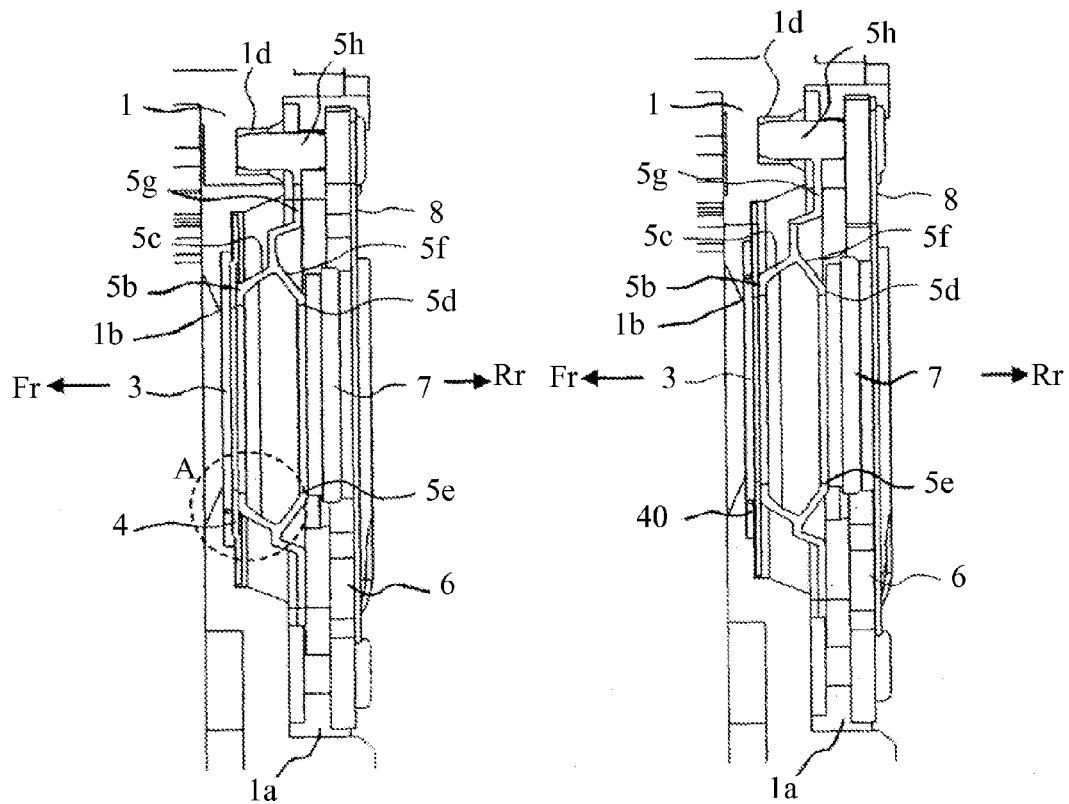
Figure 5:
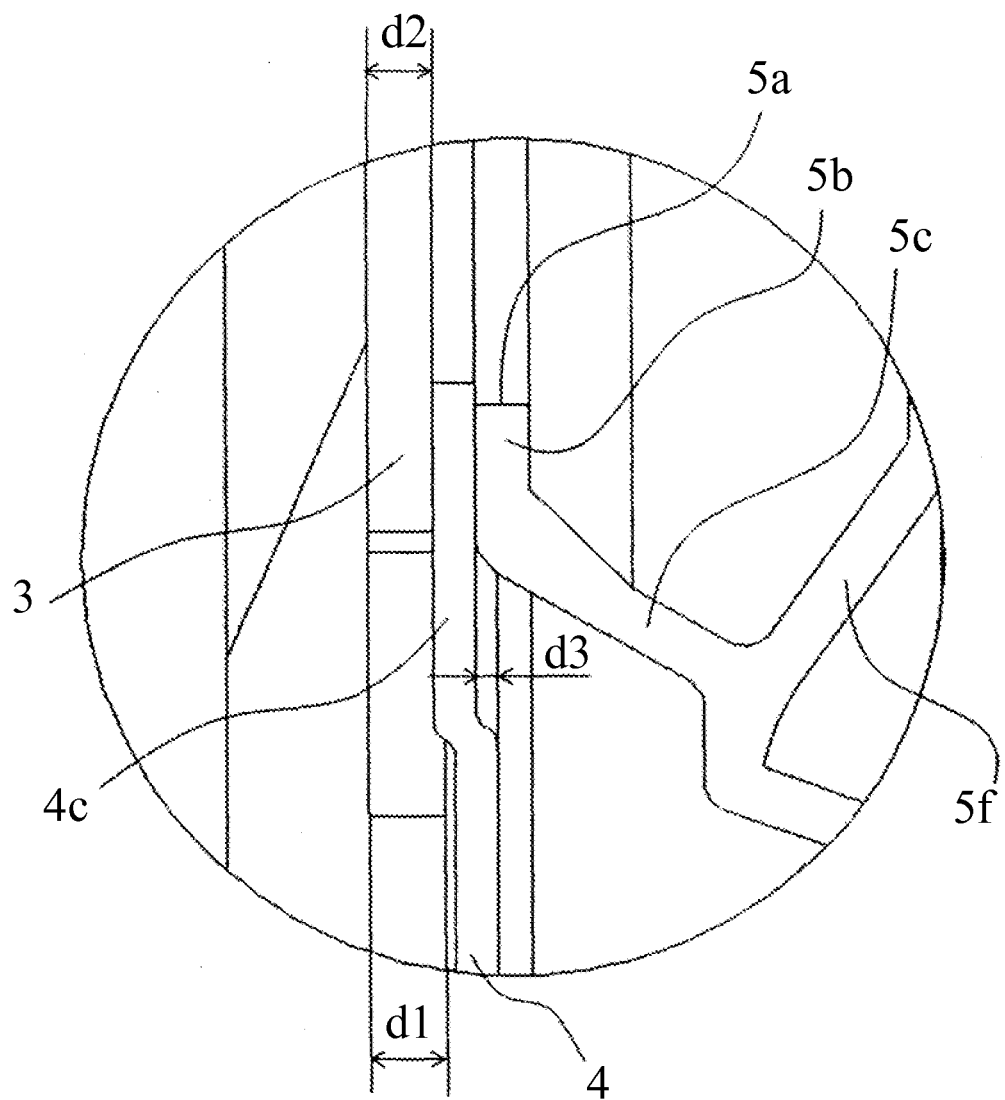
FIG. 5 is a partial enlarged view of Part A of FIG. 4B.

FIGS. 4A to 4C are schematic diagrams illustrating the fixing base plate 1 with each component. FIG. 4A is a front view, and FIGS. 4B and 4C are sectional views taken along an A-A line and longitudinal sectional views that are cut to pass a center of the urging part 5h protruding from the dustproof rubber 5. In FIG. 4C, a magnetic shield plate different from the magnetic shield plate 4 in a shape is used instead of the magnetic shield plate 4. The holding plate 6 and the image pickup element 7 are not illustrated in FIG. 4A to easily understand an explanation. FIG. 5 is a partial enlarged view of Part A of FIG. 4B.

First, the optical filter 3, the magnetic shield plate 4, the dustproof rubber 5, and the holding plate 6 holding the image pickup element 7 and the flexible substrate 8 are assembled to the housing room 1a of the fixing base plate 1 in order. In this embodiment, the magnetic shield plate 4 abuts against other members at only areas where the magnetic shield plate 4 presses the optical filter 3 and is pressed by the dustproof rubber 5 in areas perpendicular to the optical axis direction of the magnetic shield plate 4 so as to enable the magnetic shield plate 4 to certainly press the optical filter 3.

Here, as illustrated in FIG. 5, d1 represents a length in a depth direction of the housing room 1f of the fixing base plate 1, d2 represents a length in a thickness direction of the optical filter 3, and d3 represents a stepped amount of the stepped part 4c of the magnetic shield plate 4.

Setting the length d2 in the thickness direction of the optical filter 3 longer than the length d1 in the depth direction of the housing room 1f easily detaches the optical filter 3 from the housing room 1f when the optical filter 3 is assembled to the fixing base plate 1 or disturbance is applied. This causes degradation in an assembly performance and an improperly assembly. As illustrated in FIG. 5, setting the length d2 in the thickness direction of the optical filter 3 shorter than the length d1 in the depth direction of the housing room 1f to satisfy d3>d1−d2 can improve an assembly of the optical filter 3.

However, when the length d2 in the thickness direction of the optical filter 3 is shorter than the length d1 in the depth direction of the housing room 1f, using the magnetic shield plate 40 not including a stepped shape as illustrated in FIG. 4C causes the magnetic shield plate 40 to run upon the housing room 1a of the fixing base plate 1. Abutment between the optical filter 3 and the magnetic shield plate 40 thus is insufficient. Insufficient abutment between the optical filter 3 and the magnetic shield plate 40 unseals a space between the optical filter 3 and the image pickup element 7 and causes foreign matter such as dust to enter into the space. The length d2 in the thickness direction of the optical filter 3 thus is set to be longer than the length d1 in the depth direction of the housing room 1f when using the magnetic shield plate 40 not including the stepped part 4c.

As mentioned above, properly setting a relation between the length d1 in the depth direction of the housing room 1f and the length d2 in the thickness direction of the optical filter 3 enables the magnetic shield plate 40 to certainly abut against the optical filter 3 even if the magnetic shield plate 40 is in any shape. A sealed state between the optical filter 3 and the image pickup element 7 can thus be maintained.

Next, the urging part 5h of the dustproof rubber 5 is inserted into the corresponding bottomed hole 1d of the fixing base plate 1. Further, the adjusting screws 9 are inserted into the inserting holes 6b of the holding plate 6 to screw with the female screw parts 1c of the fixing base plate 1. This screw engagement seals a space between the pressing part 5b of the dustproof rubber 5 and the magnetic shield plate 4 and a space between the pressing part 5e of the dustproof rubber 5 and the image pickup element 7. The dustproof parts 5c and 5f of the dustproof rubber 5 then surrounds the circumference of the image pickup element 7. Moreover, an end of the urging part 5h of the dustproof rubber 5 abuts against the corresponding bottomed hole 1d of the fixing base plate 1, and a base end of the urging part 5h abuts against the holding plate 6.

Next, a method adjusting a position in the optical axis direction and a tilt relative to the optical axis of the image pickup element 7 is described using FIG. 4B when the receiving plane of the image pickup element 7 is shifted from the optical axis or is not orthogonal to the optical axis. In this embodiment, changing screwing amounts of three adjusting screws 9 can adjust a position and a tilt of the image pickup element 7.

When rotating three adjusting screws 9 relative to three female screw parts 1c of the fixing base plate 1 from a state of FIG. 4B so as to increase screwing amounts, the three adjusting screws 9 move the entire holding plate 6 in the front direction Fr relative to the optical axis direction through the inserting holes 6b of the holding plate 6. Press of the holding plate 6 against the urging part 5h of the dustproof rubber 5 then transforms the urging part 5h to reduce in the optical axis direction and to enlarge in a radial direction. This transformation causes the urging part 5h to have the elastic force urging the holding plate 6 backward. Press of the image pickup element 7 against the dustproof part 5f through the pressing part 5e also transforms the dustproof part 5f in the optical axis direction while deflecting.

Meanwhile, when rotating the adjusting screws 9 relative to the female screw parts 1c from a state of FIG. 4B so as to decrease screwing amounts, the adjusting screws 9 move in the rear direction Rr. The urging part 5h and the dustproof part 5f then respectively have the elastic force urging the holding plate 6 backward, and these elastic forces urges the holding plate 6 to abut against the adjusting screws 9. The entire holding plate 6 thus moves backward relative to the optical axis direction according to screwing amounts decreased by the adjusting screws 9.

Since the elastic force of the urging part 5h is larger than the elastic forces of the dustproof parts 5c and 5f, only elastic force of the urging part 5h optically adjusts the image pickup element 7 even if the holding plate 6 moves in the optical axis direction by changing screwing amounts of the adjusting screws 9. Holding of the optical filter 3 and the magnetic shield plate 4 and sealing between the magnetic shield plate 4 and the image pickup element 7 can thus be maintained. Additionally, since a thickness of the dustproof part 5f is thinner than the thickness of the dustproof part 5c so that the dustproof 5f deflects compared to the dustproof 5c, the elastic force of the dustproof part 5f is smaller than the elastic force of the dustproof part 5c. This can prevent a transformation of the opening part 5a of the dustproof rubber 5.

Rotating to increase or decrease screwing amounts of the adjusting screws 9 can adjust the position of the image pickup element 7 held by the holding plate 6 because the image pickup element 7 moves forward or backward relative to the optical axis direction. Moreover, changing screwing amounts of one screw of three adjusting screws 9 can adjust a tilt of the holding plate 6.

According to this example as discussed above, pressingly holding the optical filter 3 and the magnetic shield plate 4 using the elastic force of the dustproof rubber 5 can hold the magnetic shield plate 4 with a simple configuration without increasing components and can easily decrease a magnetic noise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the magnetic shield plate 4 is in an approximately flat plate, but may be in a box shape whose end opens to cover with the image pickup element 7.

This application claims the benefit of Japanese Patent Application No. 2014-136672, filed on Jul. 2, 2014, which is hereby incorporated by reference herein in its entirety.

What is claimed is:

1. An image pickup apparatus comprising:
an image pickup element converting an object image to an electric signal;
a magnetic shield member arranged in front of the image pickup element;
a fixing member to which the image pickup element and the magnetic shield member are attached; and
an elastic member arranged between the magnetic shield member and the image pickup element, and configured to press the image pickup element so as to surround a circumference of a light receiving plane of the image pickup element and to press the magnetic shield member toward the fixing member,
wherein the elastic member includes a first pressing part pressing the magnetic shield member,
wherein the elastic member further includes a second pressing part pressing the image pickup element,
wherein an end of the first pressing part and an end of the second pressing part are separated in an optical axis direction, and
wherein a pressing force with which the end of the first pressing part presses the magnetic shield member from an image plane side is larger than a pressing force with which the end of the second pressing part presses the image pickup element from an object side.

2. The image pickup apparatus according to claim 1, further comprising an optical filter attached to the fixing member so as to be located in front of the magnetic shield member,
wherein the elastic member presses the optical filter toward the fixing member through the magnetic shield member.

3. The image pickup apparatus according to claim 2, wherein the magnetic shield member includes a stepped shape that is pressed by the elastic member and that protrudes in a direction where the elastic member presses the magnetic shield member,
wherein the fixing member includes a housing part housing the optical filter, and
wherein a length in a depth direction of the housing part is longer than a length in a thickness direction of the optical filter.

4. The image pickup apparatus according to claim 2, wherein the fixing member includes a housing part housing the optical filter, and
wherein a length in a depth direction of the housing part is shorter than a length in a thickness direction of the optical filter.

5. The image pickup apparatus according to claim 1, wherein the elastic member is made from an elastic material.

6. The image pickup apparatus according to claim 1, further comprising a holder that holds the image pickup element and that is fixed to the fixing member,
wherein the elastic member is sandwiched between the fixing member and the holder.

7. The image pickup apparatus according to claim 6, wherein the elastic member includes a protruding part pressed by the holder to be fitted in the fixing member, and
wherein a pressing force of the holder against the protruding part is larger than pressing forces of the elastic member against the magnetic shield member and the image pickup element.

* * * * *